United States Patent [19]
Yang

[11] Patent Number: 5,547,433
[45] Date of Patent: Aug. 20, 1996

[54] DISTRIBUTED DIFFERENTIAL COUPLING COMBINED POWER SYSTEM

[76] Inventor: Tai-Her Yang, No. 32 Lane 29, Taipin St., Si-Hu Town, Dzan-Hwa, Taiwan

[21] Appl. No.: 317,597

[22] Filed: Oct. 3, 1994

[51] Int. Cl.[6] .................................................. B60K 41/14
[52] U.S. Cl. ................................................................ 477/5
[58] Field of Search ............................................. 477/3, 5

[56] References Cited

U.S. PATENT DOCUMENTS

| | | | |
|---|---|---|---|
| 2,564,393 | 8/1951 | Clancy | 477/3 |
| 2,571,284 | 10/1951 | Nims | 477/3 |
| 3,566,717 | 3/1971 | Berman et al. | 477/3 |
| 4,354,144 | 10/1982 | McCarthy | 477/5 |
| 5,285,111 | 2/1994 | Sherman | 477/3 |
| 5,415,603 | 5/1995 | Tuzuki et al. | 477/5 |

*Primary Examiner*—Dirk Wright
*Attorney, Agent, or Firm*—Bacon & Thomas

[57] ABSTRACT

A combined power system includes a rotational power source such as an internal combustion engine, the output shaft of which is arranged to drive a front section load and which is also coupled to the input shaft of an electromagnetic coupling device to drive a rear section load. The electromagnetic coupling device is controlled by an operating device to generate motor driving functions, when an input current is applied or to generate variable speed coupling functions through an output current when the electromagnetic coupling device is employed as a generator. The engine can be operated at constant speed or at a partially adjustable speed to maximize engine efficiency and reduce pollution, with one part of the differential speed output power generated throughout the differential mixing drive device being used for driving the load while the remainder of the power is converted through the generator function of the electromagnetic coupling device to charge the battery and thereby increase energy efficiency.

18 Claims, 8 Drawing Sheets

[5,547,433]

DISTRIBUTED DIFFERENTIAL COUPLING COMBINED POWER SYSTEM

BACKGROUND OF THE INVENTION

In recent years, energy and noise pollution problems have become more and more serious. A good solution to these problems would be to use electrical power driven vehicles, but development of electrical power driven vehicles has up to now been limited by the capacity of the batteries to achieve a larger moving range. Increasing the battery volume or quantity to increase the range will correspondingly increase the self-weight of the carrier, resulting in higher electrical energy consumption and does not meet economic requirements. Therefore, in the absence of a major breakthrough in solving the battery technical problems, a more practical driving method is to use combined driving structure designs. Current combined driving structure designs include:

(A) Series Combined Power Design: This design is the most typical structure for an electrically driven vehicle. In this design a generator is driven by the engine to generate electricity and charge the battery, after which the battery provides electricity to the driven motor to drive the vehicle. As the energy is converted several times, the overall efficiency of this design is low. An example of this design is the GM HX3 vehicle of General Motors.

(B) Synchronized Power on Common Shaft Design: This design involves directly series combining the engine power output shaft and the rotating shaft of the driven motor, to thereby generate driving and speed controlling functions. An example of this design is West Germany's Volkswagen CHICO sedan.

For the case of the conventional engine and motor described in (B), only one of the engine and motor can be selected for output transmission, and the combination of their power output is not available.

In contrast, the disclosed distributed differential coupling combined power system of the invention permits the output power from the output shaft of an engine (or other rotational power source) to not only drive a front section load, but also to be combined with an electromagnetic coupling device to drive a rear section load. The electromagnetic coupling device is constituted by an AC or DC, brushed or brushless electric machine, and is a two-end structure. It includes a rotational field generating structure and a rotor, and the rotor shaft (or the field rotating shaft) is used as the output shaft to form an electromagnetic coupling device, while the other end is coupled with the engine output shaft through the transmission gear system. This design is capable of adding the power and speed of the engine output to the output generated by the electromagnetic coupling device itself to drive the rear load without being affected by the speed relationship between the two. In general, it has a smaller system volume and saves the cost and space in comparison with other combined power systems.

SUMMARY OF THE INVENTION

The distributed differential coupling combined power distribution system of the invention may be used in driving vehicles, ships, flying machines or other mechanical, industrial, or processing equipment which require a rotational power source. The power system involves the rotational output shaft of a internal combustion engine (or other rotational power sources), and is not only used to drive a front section load directly or through transmission devices such as transmission gears, belts, chains, or the couplers, but is also coupled with the input shaft of an electromagnetic coupling device to drive the rear section load. The electromagnetic coupling is a two-end structure, and is respectively combined with a stator and rotor structure to be controlled by an operating device for generating motor driving functions when an input current is applied to the electromagnetic coupling device or for operating variable speed coupling functions through the output current when employed as a generator, or for use in starting the engine and as a power regeneration brake, particularly when the engine is the main transmission power source, to charge the battery through the difference between the speed of the rotational field generated by the stator and the speed of the rotor, the speed difference with the rear load section being thereby adjusted by controlling the charging current. The engine can be at a constant speed or at a speed which is partially adjustable to maintain a working speed having a higher operating efficiency and lower pollution, with a portion of the differential speed output power generated through the electromagnetic coupling device being used for driving the load while the remaining part of the power is converted through the generator function of the electromagnetic coupling device to charge the battery. The electromagnetic coupling thereby promotes engine efficiency during variable speed driving at low driving speeds while acquiring charging power for the battery and reducing pollution, and in addition to providing a variable speed coupling, the electromagnetic coupling can also be used as a driving motor to generate a rotational output for driving the load independently of or together with the engine.

DETAILED DESCRIPTION OF THE PREFERRED EMBODIMENTS

Figure 1:
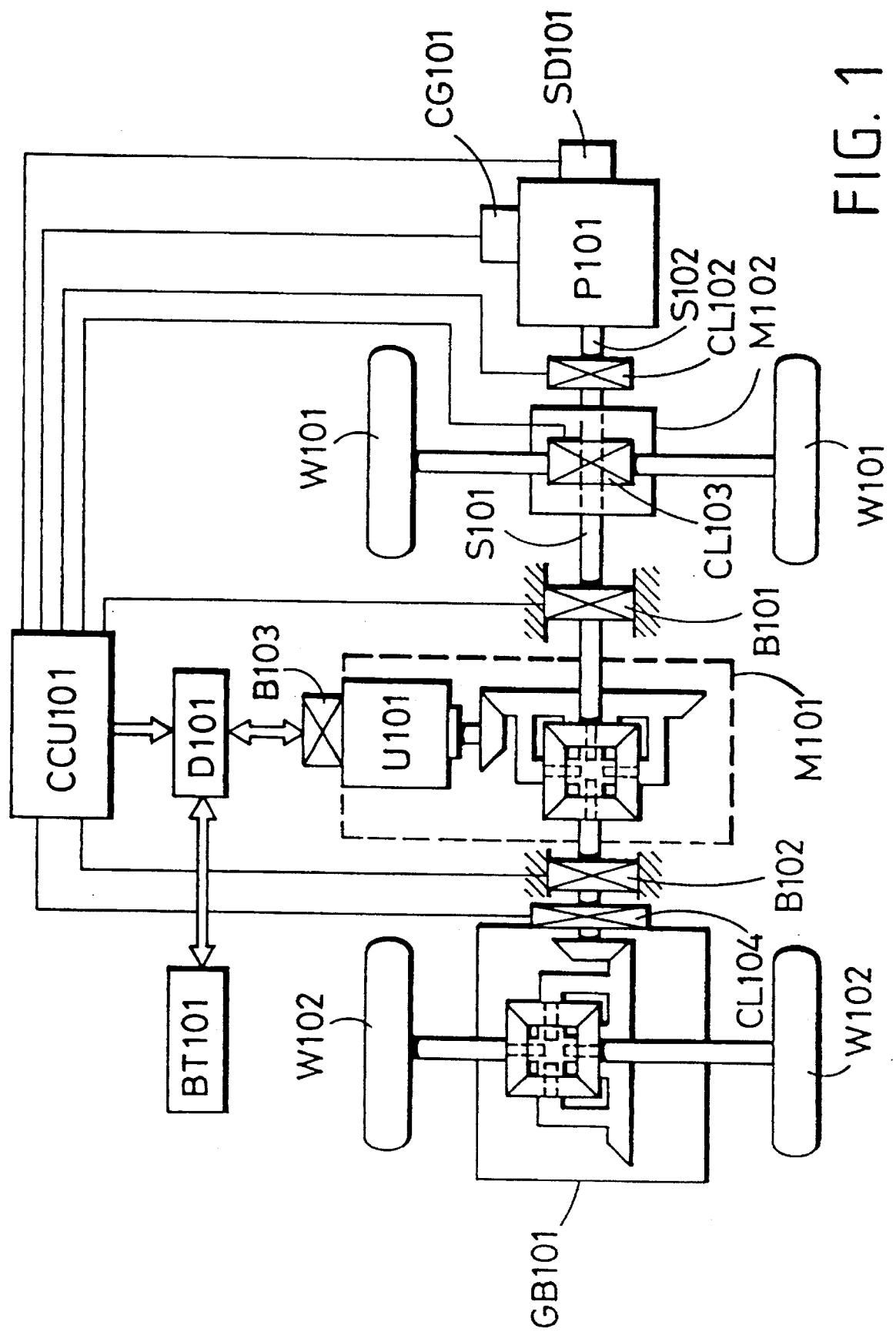
FIG. 1 is a schematic diagram of the system of a first preferred embodiment.

FIG. 1 shows a preferred embodiment of a distributed differential coupling combined power system, including the following principal elements:

A drive side rotational power source, having an output which is first supplied to control the front section load and then transmitted to the input end of a two-end shaft type electromagnetic coupling device to drive a rear section load;

An electromagnetic coupling device connected by a direct transmission to another load, through a transmission component to another load, or through a differential gear system to a differentially acting load such as the side rear wheels of a vehicle.

More specifically, the embodiment illustrated in FIG. 1 includes the following elements:

A drive side rotational power unit P101 in the form of an internal combustion engine or other power source, wherein the rotational output shaft S102 coupled to a middle transmission device and a control interface M102 through a clutch CL102. Engine P101 further includes a speed sensor SD101 for transmitting an engine rotation signal to a central controller CCU101, with the controllable fuel valve CGIOI being controlled by the central controller CCU101 to change the engine speed or to keep the engine maintained at a constant speed;

A middle transmission device and a control interface M102 made up of an automatic or manual speed change control system similar to one in a conventional front wheel drive system but which can be used to drive the front section load only or to drive front and rear loads. A clutch CL103 is installed between the middle input shaft S101 and the front section load to provide the transmission coupling or to cut off the transmission relationship between the middle transmission device and the front wheels, although the clutch CL103 can also be replaced by a neutral shift or co-installed with the neutral shift when the shift interface is in a neutral shift status. The middle shaft S101 is coupled at the output end of the clutch CL102 and is either directly rearwardly extended or connected through a transmission device to cause the rotational speed difference between the middle shaft S101 and the output presented to have a constant speed ratio or a non-constant speed ratio, in a manner similar to the rear extended rear wheel transmission shaft in a four wheel drive vehicle. A brake B101 controlled by the central controller CCU101 is further installed between the middle shaft S101 and the fixed casing;

A direct driven front section load W101 made up of one or more than one driven wheels with driven resistance of a load;

An electromagnetic coupling device M101 in the form of a two-end shaft structure which is made up of a rotational field generating structure and a rotor, and in which the rotational field and the rotor are respectively coupled with the transmission middle shaft S101 and the input shaft of a rear differential gear box GB101 through a clutch CL104, to thereby drive the differential rear section load W102 at both sides. The coupling device may be an AC or DC, brushed or brushless electrical machine, and in particular a series excited or auxiliary compound excited electrical machine having the electrical characteristic that its rotational speed increases with a decreasing load, or an AC or DC brush or brushless machine able to perform current control (including constant current control) through the operating control of a drive circuit device D101 to help provide additional torque on the driven load;

An optional clutch CL101 controlled by the central controller CCU101 and installed between the rotational field generating structure and the rotor as required to directly provide a synchronized mechanical interlock between the field and rotor.

A drive circuit device D101 which is installed between the electromagnetic coupling device M101 and the battery BT101 for receiving operating commands from the central controller CCU101 to control the electromagnetic coupling device functioned so as to function as a generator to charge the battery or supply power to the other load or to provide a current controllable generator output to control the coupling torque, thereby changing the rotation speed in dependence on load conditions;

A central controller CCU101 which follows commands from the operator and monitors the operating status of the drive side rotational power unit P101 to generate corresponding control commands for the drive circuit device D101;

An optional brake B102 can be installed as needed between the casing of the electromagnetic coupling device M101 and the side of a clutch CL104 which is located between the electromagnetic coupling device double acting structure and the coupled rear differential gear box, to thereby drive the front section load, start the engine, or provide power generation at stand-still, at which time the electromagnetic coupling device is driven by the engine to function as a generator to charge the battery or supply power to the other loads. For the case of AC power generation output functions, the electromagnetic coupling device M101 is employed as an electrical machine with AC power generating functions and made up of a permanent magnet or winding excited, variable frequency field type of electrical device, or a brushed alternator type of electrical device, armature winding being commonly installed with the conducting rings for AC output and with the commutators for DC input/output, as a result of which the AC output can be a variable frequency output or a constant frequency output depending on the engine constant speed control;

Finally, the aforesaid direct driven load and the distributed differential load may be made up of one or more than one rotational power sources, or one or more than one direct driven load, or one or more than one double acting electromagnetic coupling device and its driven load groups in sequential series combinations, to form an extended compound series combined structure.

The functions of the preferred embodiment shown in FIG. 1 are illustrated in Table 1 as follows:

F1-A F1-B F1-C F1-D are the various system operations when the engine drives the load at low speed output;

F2 and F3 are system operations when the electromagnetic coupling device is powered by a battery to drive the load as a motor;

F4-A and F4-B are system operations when the electromagnetic coupling device is powered by the battery to be operated as a motor drives the load with the engine together so as to have a large power output due to the addition of output power;

F5, F6 and F7 are system operations when the electromagnetic coupling device is operated as a generator driven by the feedback mechanical energy of the load to charge the battery or to function as a brake by utilizing the friction damping of the engine itself;

F8 is the system operation when the electromagnetic coupling device is driven by the engine to be operated as a generator to charge the battery. This function can further include a charging timing control to stop automatically at a preset time and AC generating functions as decided above.

F9 is a function in which the electromagnetic coupling device is operated as a motor and is powered by the battery to start the engine;

F10 is a function in which all of the system clutches and brakes are in an "OFF" state to provide low loss sliding operation.

The above system operating functions listed in Table 1 are described in more detail as follows:

F1-A. To achieve this function, the engine fuel valve is controlled to drive the engine from low speed to high speed, as follows:

The internal combustion engine services as the drive side rotational power source and is controlled by the engine fuel valve to drive the rear section load, at which time clutches CL101, CL102, and CL104 are in an ON state while the CL103 is in an OFF state and the brakes B101 and B102 are in an OFF state;

The internal combustion engine serves as the drive side rotational power source and is controlled by the engine fuel valve to drive the front and rear section loads, at which time clutches CL101,, CL102, CL103 and CL104 are all in an ON state and the brakes B101 and B102 are in an OFF state;

The internal combustion engine serves as the drive side rotational power source and is controlled by the engine fuel valve to drive the front section load, at which time clutches CL102 and CL103 are in an ON state while the clutches CL101 and CL104 are in an OFF state, and the brakes B101 and B102 are in an OFF state, and the electromagnetic coupling is in a no-load state;

F1-B: To achieve this function, the engine fuel valve and the electromagnetic coupling device M101 is controlled simultaneously to drive the engine from low speed to high speed and to charge the battery simultaneously, as follows:

The internal engine serves as the drive side rotational power source and is controlled by the engine fuel valve to change the engine and operate the electromagnetic coupling device as a generator for charging the battery and driving the rear section load, at which time the clutches CL101 and CL103 are in an OFF state while the clutches CL102 and CL104 are in an ON state and the brakes B101 and B102 are in an OFF state;

The internal combustion engine serves as the drive side rotational power source and is controlled by the engine fuel valve to change the engine speed change and operate the electromagnetic coupling device as a generator to charge the battery and to drive the front and rear section loads together with the engine, at which time the clutches CL102, CL103 and CL104 are in an ON state while the CLI01 is in an OFF state and the brakes B101 and B102 are in an OFF state;

The internal combustion engine serves as the drive side rotational power source and is controlled by the engine fuel valve to change the engine speed and drive the front section load as well as to operate the electromagnetic coupling device as a generator to simultaneously charge the battery, at which time the clutches CL101 and CL104 are in an OFF state while the CL102 and CL103 are in an ON state; the brakes B101 is OFF and the B102 is in an ON state.

F1-C: To achieve this function, the engine is speed controlled or operated at a constant speed, and the battery charging current from the M101 is controlled to change the output power to the load as follows:

The internal combustion engine serves as the drive side rotational power source, and the engine is controlled by the engine fuel valve and the speed feedback signal to operate at a constant speed as well as to operate the electromagnetic coupling device as a generator to charge the battery and adjust the coupling torque to drive the rear section load, at which time the clutches CL101 and CL103 are in an OFF state while the clutches CL102 and CL104 are in an ON state and the brakes B101 and B102 are in an OFF state;

The internal combustion engine serves as the drive side rotational power source, and the engine speed is controlled by the engine fuel valve and the speed feedback signal to drive the front section load as well as to operate the electromagnetic coupling device as a generator to charge the battery, and to adjust the coupling torque to drive the rear section load, at which time the clutches CL101 is in an OFF state while the clutches CL102, CL103 and CL104 are in an ON state and the brakes B101 and B102 are in an OFF state;

F1-D: To achieve this function, electromagnetic coupling device M101 generates a short current to control the output shaft torque and thereby change the engine speed, as follows:

The internal combustion engine serves as the drive side rotational power source, and the engine fuel valve and the speed feedback signal are utilized to operate the engine at a variable speed or a constant speed and simultaneously to operate the electromagnetic coupling device M101 as a generator and control, based on the generated short circuit, current, the coupled torque, thereby to changing the power distribution between the front and rear section loads, at which time the clutches CL101 and CL103 are in an OFF state while the clutches CL102 and CL104 are in an ON state and the brakes B101 and B102 are in an OFF state;

The internal engine serves as the drive side rotational power source, and the engine fuel valve and speed feedback signal are utilized to control the engine speed and simultaneously to operate the electromagnetic coupling device M101 as a generator and control on a generated short cut circuit current to change the coupled torque, thereby changing the power distribution between the front and rear section loads, at which time the clutch CL101 is in an OFF state while the clutches CL102, CL103 and CL104 are in an ON state and the brakes B101 and B102 are in an OFF state;

F2: To achieve this function, electromagnetic coupling device M101 is powered by the battery to change the speed or the rotation direction of the rear section load, as follows:

The electromagnetic coupling device M101 is powered by the battery to drive the rear section load by operating the electromagnetic coupling device M101 as a motor while the brake B101 is in an ON state and the brake B102 is in an OFF state, the clutches CL101, CL102 and the clutch CL103 for controlling the front section load are in an OFF state, and the CL104 is in an ON state.

F3: To achieve this function, electromagnetic coupling device M101 is powered by the battery to change the speed or the rotation direction of the front section load, as follows:

The electromagnetic coupling device M101 is powered by the battery to drive the front section load, at which time the electromagnetic coupling device is operated as a motor while the brake B102 is in an ON state, the brake B101 is in an OFF state, the clutches CL101, CL102 and CL104 are in an OFF state, and the clutch CL103 is in an ON state.

F4-A: To achieve this function, the engine is operated at a preset speed while the electromagnetic coupling device M101 is operated as a motor to provide added power output to drive the rear section load as follows:

The internal combustion engine serves as the drive side rotational power source, and is operated at a variable or constant speed while the electromagnetic coupling device M101 is powered by the battery to provide an added power output for driving the rear section load simultaneously. At this time, the clutches CL101 and CL103 are in an OFF state while the CL102 and CL104 are in an ON state and the brakes B101 and B102 are in an OFF state;

F4-B: To achieve this function, the engine is operated at a preset speed while the electromagnetic coupling device M101 is operated as a motor to provide added power output to drive the front and rear section loads as follows:

The internal engine serves as the drive side rotational power source, and the engine is operated at a variable or constant speed while the electromagnetic coupling device M101 is powered by the battery to provide added power output to drive the front and rear section loads simultaneously. At this time, the clutch CL101 is in an OFF state while the clutches CL102i CL103 and CL104 are in an ON state and the brakes B101 and B102 are in an OFF state;

F5: To achieve this function the electromagnetic coupling device M101 is operated as a generator to charge the battery using the recovered rear section kinetic energy as follows:

The engine speed is reduced or the fuel valve is closed and the electromagnetic coupling device M101 is operated as a generator to convert the rotational mechanical energy of the rear section load into electric power to charge the battery, or to consume the electric power by other loads, thereby obtaining friction damping and, together with the engine piston friction damping, provide a braking friction damping, during the brakes B101 and B102 are in an OFF state, the clutches CL101 and CL103 are in an OFF state, the clutches CL102 and CL104 in an ON state, and the engine can be stopped or slowly operated;

The electromagnetic coupling device M101 is operated as a generator to convert the rotational mechanical energy of the rear section load into electric power to charge the battery, or to consume the electric power by other loads, thereby obtaining friction damping, during which the brake B101 is in an ON state while the brake B102 is in an OFF state, the clutches CL101, CL102 and CL103 are at OFF state, and the engine can be stopped or operated at a slower speed than the sliding speed, and when the CL104 is at ON state, the engine can be operating or stopped.

F6: To achieve this function the electromagnetic coupling device M101 is operated as a generator to charge the battery using the recovered front section kinetic energy, as follows:

The engine speed is reduced or the fuel valve is closed and the electromagnetic coupling device M101 is operated as a generator to convert the rotational mechanical energy of the front section load into electric power to charge the battery, or to consume the electric power by other loads, thereby obtaining friction damping and together with the engine piston friction damping provide a braking friction damping, during which the brake B101 is in an OFF state, the brake B102 is in an ON state, the clutches CL101 and CL104 are in an OFF state, the clutches CL102 and CL103 are in an ON state, and the engine can be stopped or slowly operated;

The electromagnetic coupling device M101 is operated as a generator to convert the rotational mechanical energy of the front section load into electric power to charge the battery, or to consume the electric power by other loads, thereby obtaining friction damping, during which the brake B102 is in an ON state, the brake B101 is in an OFF state, the clutches CL101, CL102 and CL104 are in an OFF state, the clutch CL103 is in an ON state, and the engine can be stopped or operated at a slower speed than the sliding speed, and when the CL102 is in an OFF state, the engine can be in an operating state or stopped.

F7: To achieve this function, all of the loads are braked by engine friction damping, as follows:

The engine speed is reduced or the fuel valve is closed and the generator is operated to convert the rotational mechanical energy of the front and rear section loads into friction damping and together with the engine piston friction damping provide a braking friction damping, during which brakes B101 and B102 are in an OFF state, the clutch CL101 is in an OFF state, the clutches CL102, CL103 and CL104 are in an ON state, and the engine can be stopped or slowly operated;

F8: To achieve this function, the system is self charged, as follows:

The electromagnetic coupling device M101 is driven by the drive side rotational power source to be operated as a generator to charge the battery or supply power to other loads. At this time, when the engine is started, the brake B101 is in an OFF state, brake B102 is in an ON state, the clutches CL101, CL103, and CL104 are in an OFF state, the clutch CL102 is in an ON state; and the time can be further utilized to preset the engine charging time or control the charging capacity for automatic stop. AC Power generating functions can be included as described above in connection with the description of generator structure.

F9: To achieve this function, the electromagnetic coupling device M101 is operated as a motor to start the engine, as follows:

The electromagnetic coupling device M101 is used to start the drive side engine, at which time brake B102 is in an ON state, brake B101 is in an OFF state, the front section operating interface M102 and the front section coupled clutches CL101, CL103 and CL104 are in an OFF state and clutch CL102 is in an ON state;

F10: Neutral slide: This is the slide function of the system when no power is output and a brake is activated, at which time the engine can be in an operating state or stopped, brakes B101 and B102 are in an OFF state, and the clutches CL101, CL102, CL103 are in an OFF state.

F11: To achieve this function, the engine is used to drive the front section load, and the electromagnetic coupling device M101 is powered by the battery to drive the rear section load, and both are independently operated to drive the respective loads, at which time brake B101 is in an ON state, brake B102 is in an OFF state, clutches CL101, CL105 are in an OFF state, and clutches CL102, CL103 and CL104 are in an ON state:

F12: To achieve this function, the engine is used to drive the front section load and the electromagnetic coupling device M101 is operated as a generator to charge the battery, at which time brake B101 is in an ON state, B102 is in an OFF state, clutches CL101, CL105 are in an OFF state, and clutches CL102, CL103 are in ON state.

Figure 2:
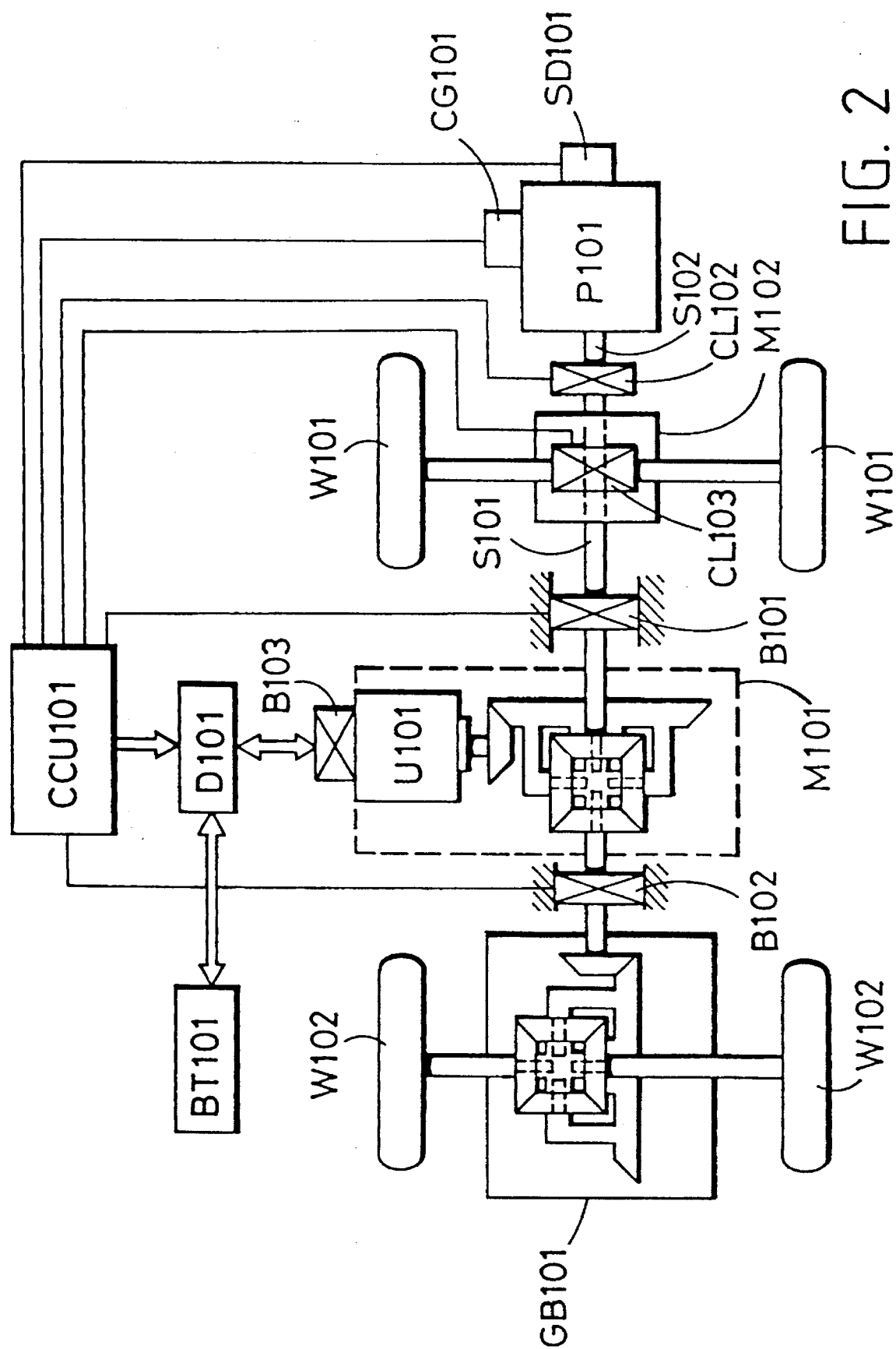
FIG. 2 is a schematic diagram of a first variation of the system of FIG. 1.

The preferred embodiment of the distributed differential coupling combined power system shown in FIG. 1 may have the following variations in practical applications:

FIG. 2 shows the first application of the system of FIG. 1. In this application clutch CL104 and brake B102 are both eliminated, and the system functions are delineated in Table 2.

Figure 3:
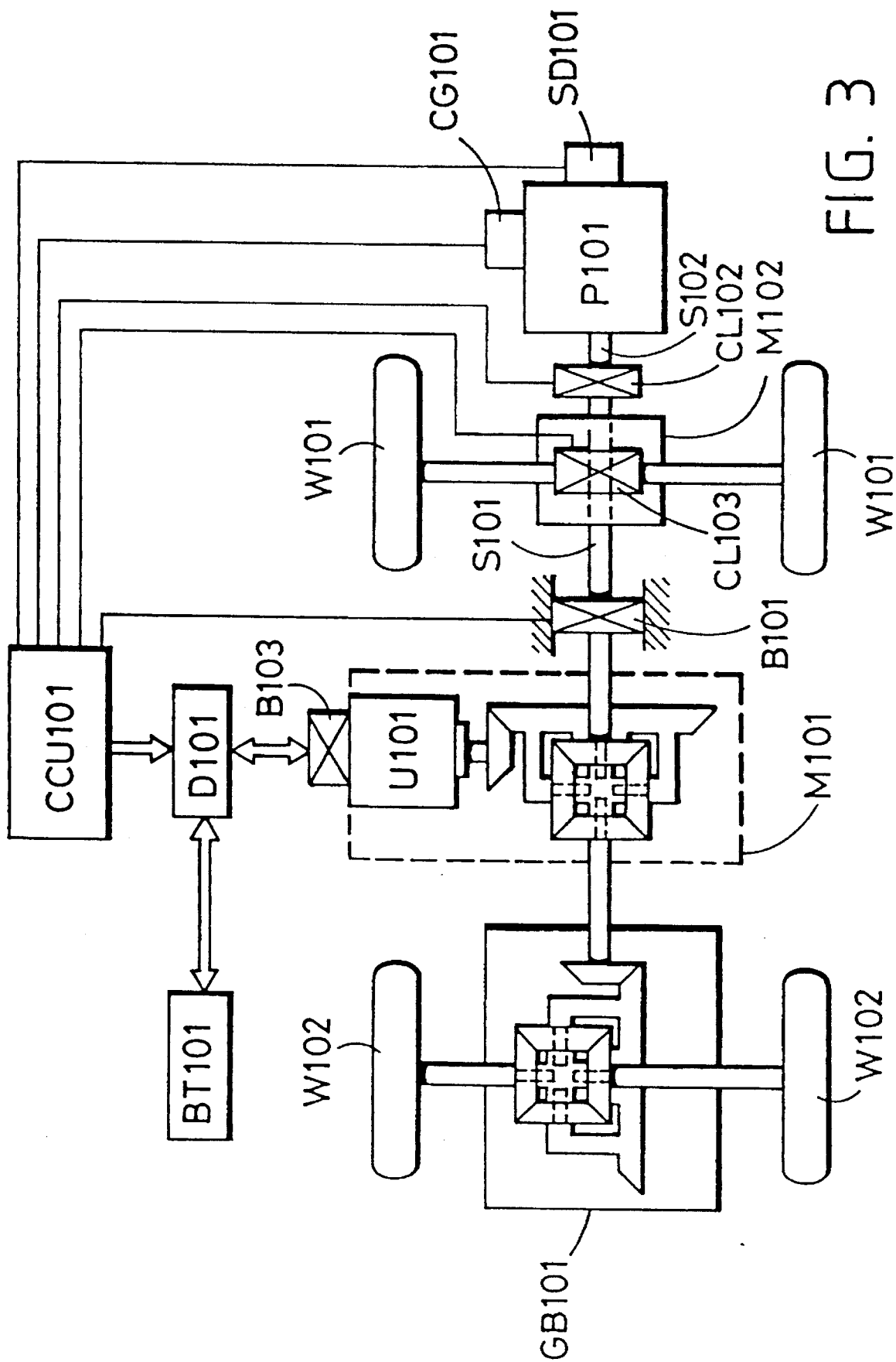
FIG. 3 is a schematic diagram of a second variation of the system of FIG. 1.

FIG. 3 shows the second application of the system of FIG. 1. In this application clutch CL104 and brake B102 are both eliminated, and the system functions are delineated in Table 3.

Figure 4:
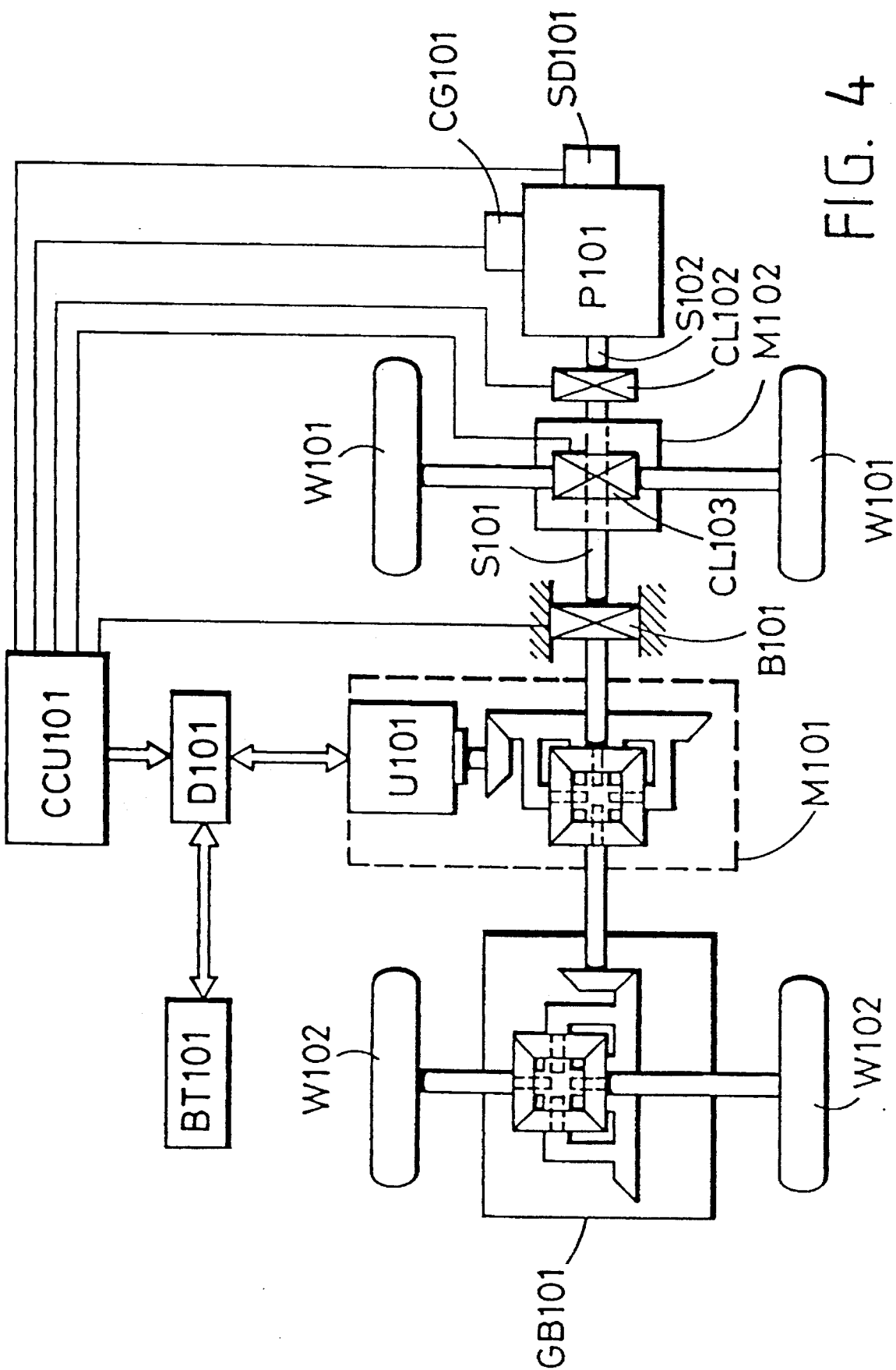
FIG. 4 is a schematic diagram of a third variation of the system of FIG. 1.

FIG. 4 shows the third application of the system of FIG. 1: It discloses an application in which B102, and clutches CL101 and CL104 are eliminated, and the system functions are delineated in Table 4.

Figure 5:
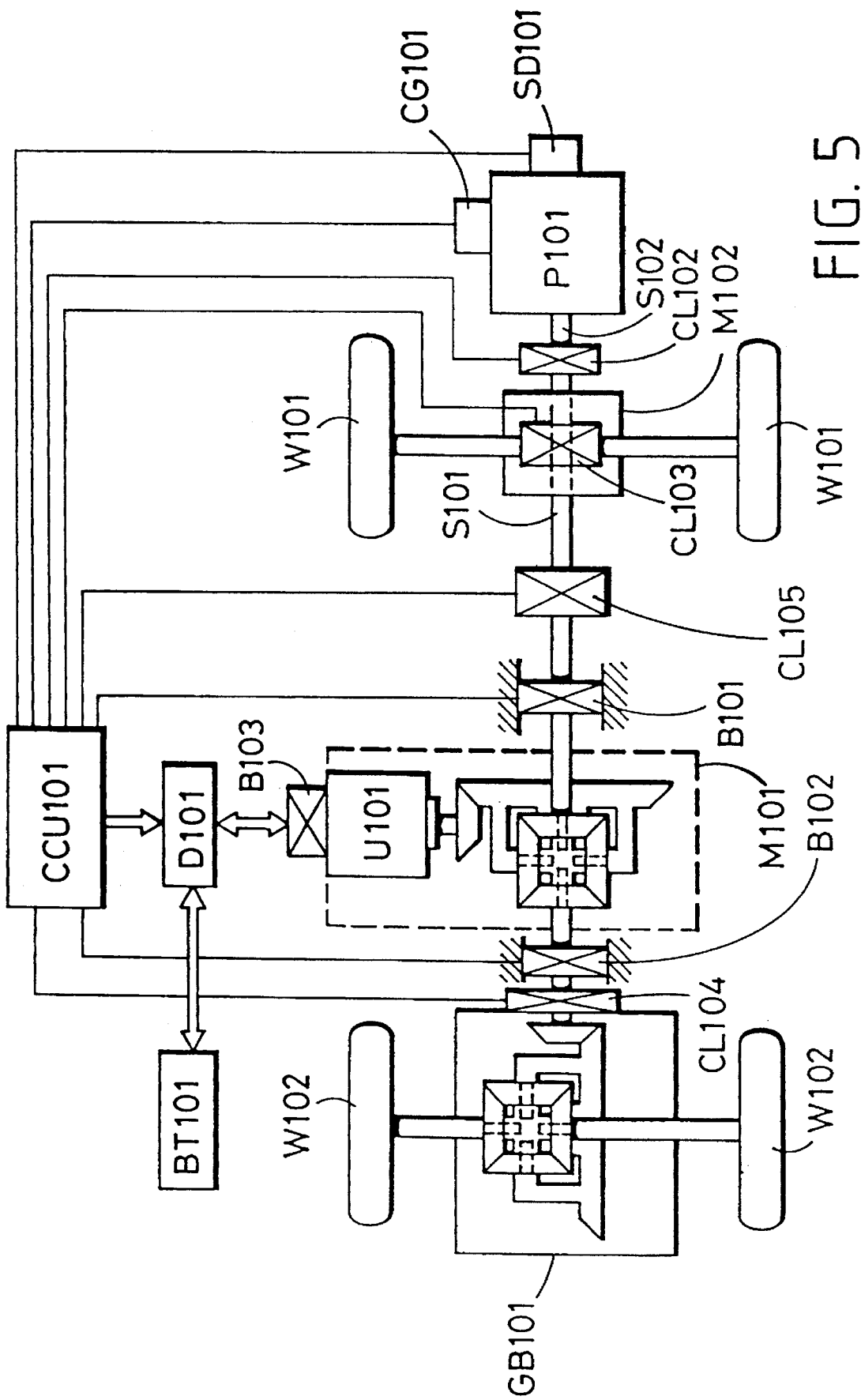
FIG. 5 is a schematic diagram of a fourth variation of the system of FIG. 1.

FIG. 5 shows the fourth application of the system of FIG. 1: it discloses an application in which an additional clutch CL105 is installed between the rear section output middle shaft and the middle transmission device while clutch CL103 is reserved for controlling the front section load or replaced by a speed change shift of the middle transmission devices, and the system functions are delineated in Table 5.

Figure 6:
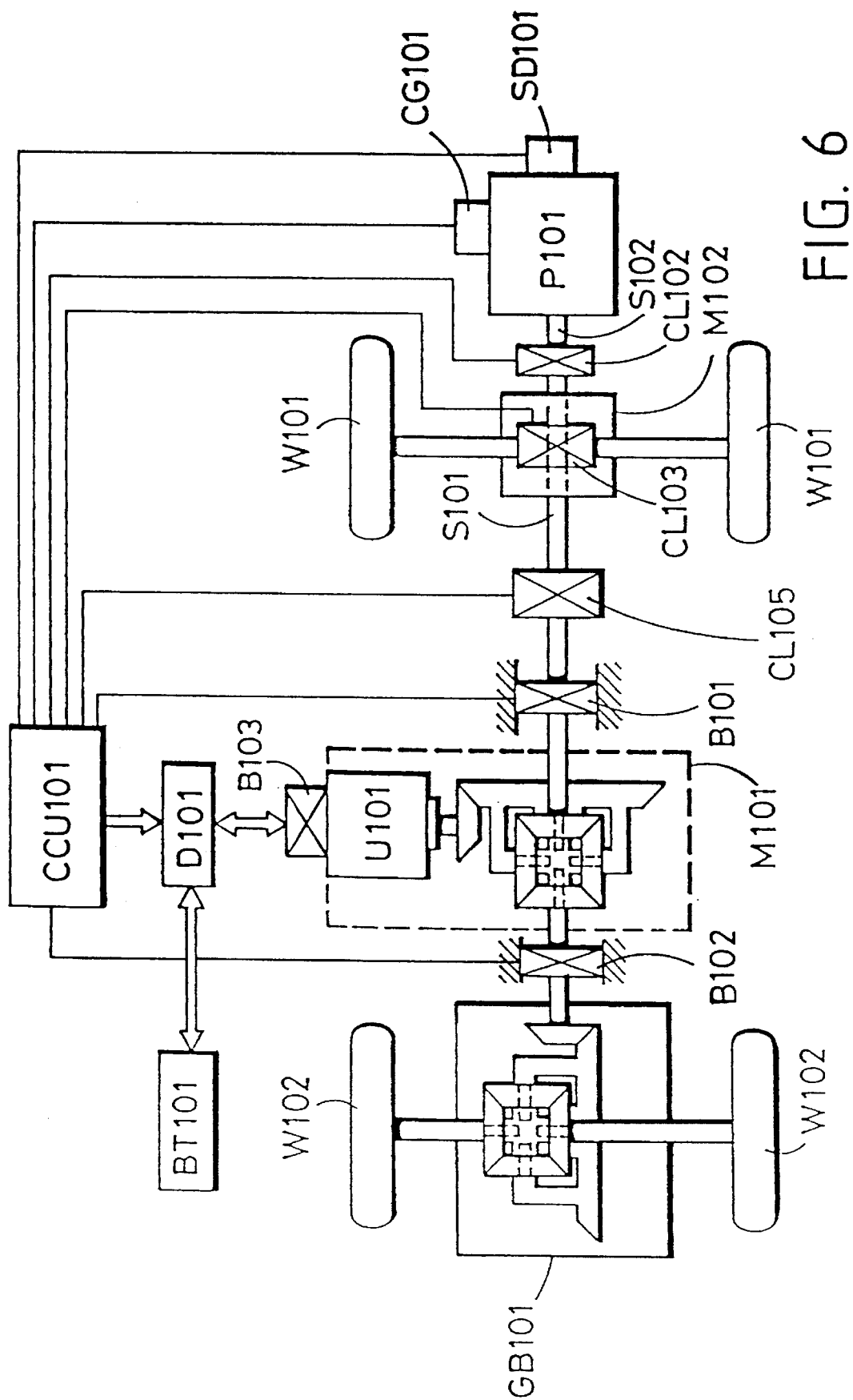
FIG. 6 is a schematic diagram of a fifth variation of the system of FIG. 1.

FIG. 6 shows the fifth application of the system of FIG. 1. In this application, a clutch CL105 is installed between the rear section output middle shaft and the middle transmission device, clutch CL104 is eliminated, and the system functions are delineated in Table 6.

Figure 7:
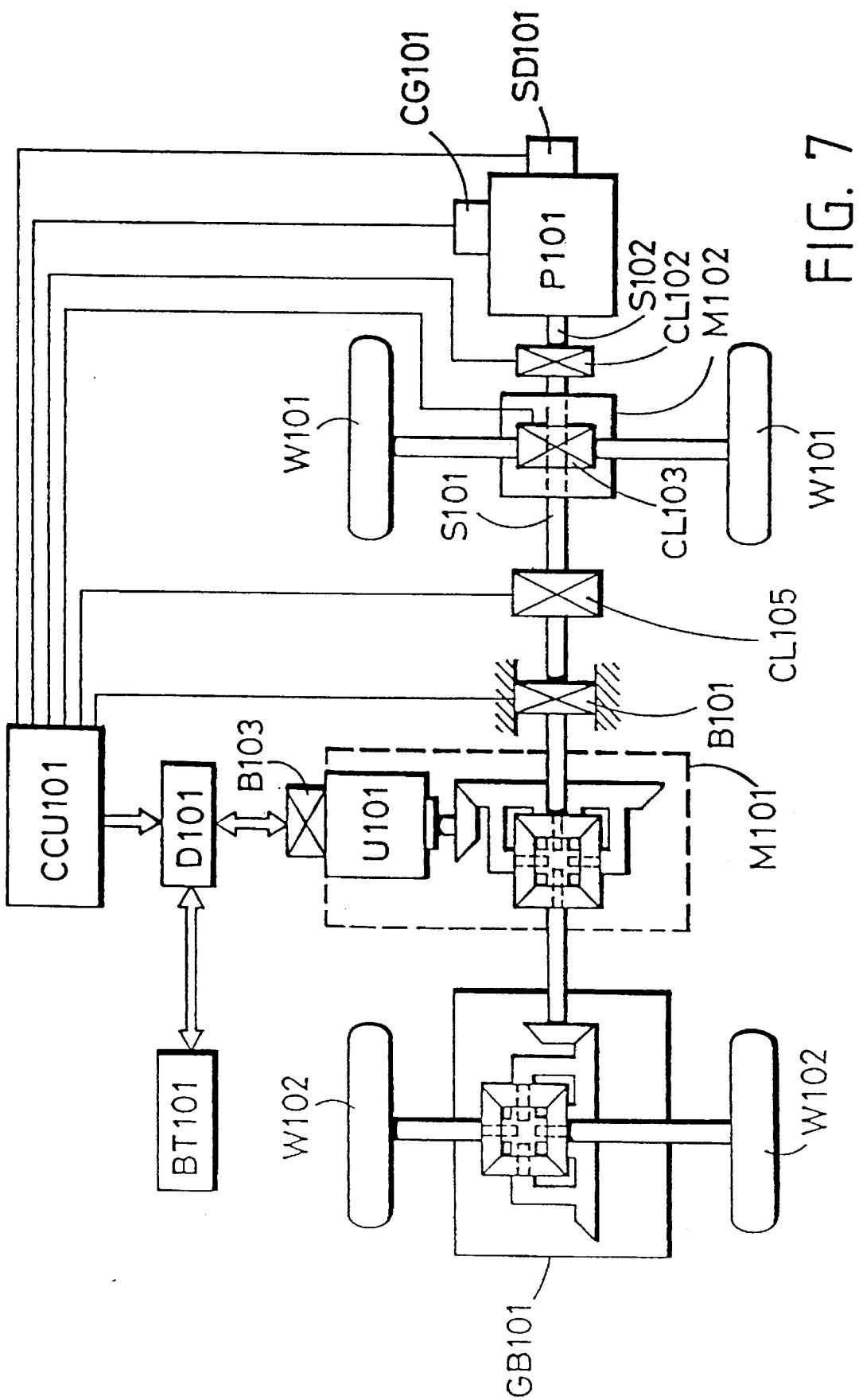
FIG. 7 is a schematic diagram of a sixth variation of the system of FIG. 1.

FIG. 7 shows the sixth application of the system of FIG. 1. In this application a clutch CL105 is installed between the rear section output middle shaft and the middle transmission device, clutch CL104 and brake B102 are eliminated, and the system functions are delineated in Table 7.

Figure 8:
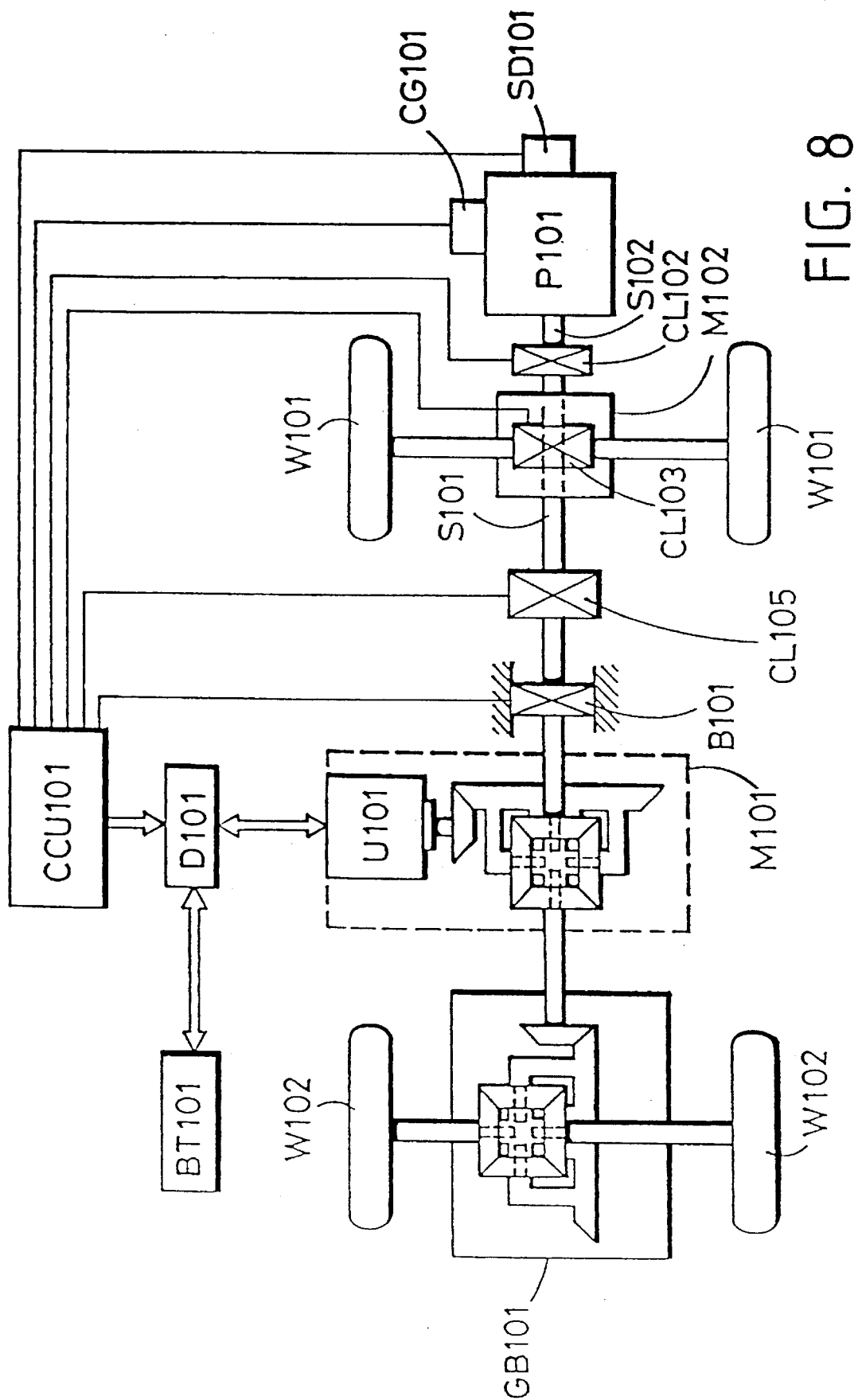
FIG. 8 is a schematic diagram of a seventh variation of the system of FIG. 1.

FIG. 8 shows the seventh application of the system of FIG. 1. It discloses an application which includes additional clutch CL105 and eliminates clutches CL101, CL104 and brake B102, and the system functions are delineated in Table 8.

The above described application examples are for reference only, and it will be appreciated that other practical applications can be achieved by arranging the front and the rear section loads and distributed coupling structure according to performance requirements without departing from the invention by selecting the appropriate operating and control components.

For the case when the systems of the examples in FIG. 1–8 are applied to vehicles, the angular displacement relationships between the front and rear section loads and the drive power source resulting from the transmission ratio and the wheel outside diameter differences may be as follows: The angular displacement speed of the two loads and the drive side rotational power source are operated according to the wheel system ratio relationships, or the angular displacement relationship between the two loads and their operations with the drive side rotational power source are not according to the wheel system ratio (such as slipping on the road surface). In particular, the relationships between the angular displacement of the rear section load and the drive side power source or between the front and rear section loads can be especially set not to operate according to the wheel system ratio relationship, but to operate through the differential acting adjustment by the electromagnetic coupling device;

The differentially acting adjustment of the electromagnetic coupling device M101 includes an active adjustment based on the input power when functioning as a motor or a passive adjustment to output power when functioning as a generator;

In vehicle driving applications of the aforesaid front section load and the rear section load, the front section load can be the front wheel or the rear wheel, and the rear section load can be the matched front wheel or rear wheel structure with the aforesaid definition;

The distributed differential coupling combined power system has possible numerous operating functions and in the practical applications can be constructed to be provide all or part of those functions.

As summarized from the above descriptions, the distributed differential coupling combined power system of the invention can be applied to vehicles, boats, or other machinery requiring combined driving power. The examples given herein encompass the various applications of the basic distributed differential coupling combined power system concept of the invention and in practical applications, any peripheral components for the output functions can be selected according to need, providing a highly flexible system.

TABLE 1

| FUNCTIONS | B101 | B102 | P101 | CL101 | CL102 | CL103 | CL104 | G/M (M101) | BT101 | REMARK | (function description) |
|---|---|---|---|---|---|---|---|---|---|---|---|
| F1-A | OFF | *OFF<br>OFF<br>*OFF | 0-MAX | *ON<br>ON<br>*OFF | ON | *OFF<br>ON<br>*ON | *ON<br>ON<br>*OFF | *READY<br>READY<br>*READY | *READY<br>READY<br>*READY | *Drive the rear section load<br>Drive the front and rear section loads simultaneously<br>*Drive the front section load | The engine fuel valve is controlled to drive the engine from low speed to high speed |
| F1-B | OFF | *OFF<br>OFF<br>*ON | 0-MAX | *OFF | ON | *OFF<br>ON<br>*ON | *ON<br>ON<br>*OFF | GEN- | DIS-CHARGE | | The engine fuel vale and the M101 is controlled simultaneously to drive the engine from low speed to high speed and to charge the battery simultaneously |
| F1-C | OFF | OFF | *0-MAX OR CONSTANT SPEED<br>**0-MAX | OFF | ON | *OFF<br>**ON | ON | GEN- | DIS-CHARGE | *Drive the rear section load<br>**Drive the front and rear section loads simultaneously | The engine is speed controlled or operated at a constant speed, wherein the battery charging current from the M101 is controlled to change the output power to the load; |
| F1-D | OFF | OFF | *0-MAX OR CONSTANT SPEED<br>**0-MAX | OFF | ON | *OFF<br>**ON | ON | GEN- | READY | *Drive the rear section load<br>**Drive the front and rear section loads simultaneously | The engine is speed controlled or operated at a constant speed, wherein the M101 generates short cut current to control the output shaft torque, thereby to change the engine speed |
| F2 | ON | OFF | STOP | OFF | OFF | OFF | ON | MOTOR | DIS-CHARGE | | The M101 is powered by the battery to change the speed or the rotation direction of the rear section load |
| F3 | OFF | ON | STOP | OFF | OFF | ON | OFF | MOTOR | DIS-CHARGE | | The M101 is powered by the battery to change the speed or the rotation direction of the front section load |
| F4-A | OFF | OFF | 0-MAX OR CONSTANT SPEED | OFF | ON | OFF | ON | MOTOR | DIS-CHARGE | | The engine is operated at a preset speed while the M101 is operated as a motor to provide added power output to drive the rear section load |
| F4-B | OFF | OFF | 0-MAX | OFF | ON | ON | ON | MOTOR | DIS-CHARGE | | The engine is operated at a preset speed while the M101 is operated as a motor to provide added power ouptput to drive the front and rear section loads |
| F5 | *OFF<br>**ON | OFF | *SLOW OR STOP<br>**STOP-MAX | OFF | *ON<br>**OFF | OFF | ON | GEN- | CHARGE | *The engine piston friction damping is activated simultaneously<br>**Recovery of the kinetic energy | The M101 is operated as a generator to charge the battery using the recovered rear section kinetic energy |
| F6 | OFF | ON | *SLOW OR STOP<br>**STOP-MAX | OFF | *ON<br>**OFF | ON | OFF | GEN- | CHARGE | *The engine piston friction damping is activated simultaneously<br>**Recovery of the kinetic energy | The M101 is operated as a generator to charge the battery using the removed front section kinetic energy |

TABLE 1-continued

| | | | | COMPONENTS | | | | | | |
|---|---|---|---|---|---|---|---|---|---|---|
| FUNCTIONS | | B101 | B102 | P101 | CL101 | CL102 | CL103 | CL104 | G/M (M101) | BT101 | REMARK |
| F7 | All the loads are braked by the engine friction damping | OFF | OFF | SLOW OR STOP | OFF | ON | ON | ON | READY | READY | |
| F8 | The system is self charged (It can be stopped at a preset time or controlled by the capacity) through that the M101 is drived by the engine to be operated as a generator to charge the battery or to provide varied or constant frequency AC generation output | OFF | ON | 0-MAX OR CONSTANT SPEED | OFF | ON | OFF | OFF | GEN- | CHARGE | |
| F9 | The M101 is operated as a motor to start the engine | OFF | ON | STOP TO START | OFF | ON | OFF | OFF | MOTOR | DIS-CHARGE | |
| F10 | Neutral Slide | OFF | OFF | STOP OT 0-MAX | OFF | OFF | OFF | OFF | READY | READY | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 2

| FUNCTIONS | Description | B101 | B102 | P101 | CL101 | CL102 | CL103 | CL104 | G/M (M101) | BT101 | REMARK |
|---|---|---|---|---|---|---|---|---|---|---|---|
| F1-A | The engine fuel valve is controlled to drive the engine from low speed to high speed | OFF | *OFF **OFF ***OFF | 0-MAX | *ON **ON ***OFF | ON | *OFF **ON ***ON | *ON **ON ***OFF | *READY **READY ***GEN- | *READY **READY ***CHARGE | *Drive the rear section load **Drive the front and rear section loads simultaneously ***Drive the front section load |
| F1-B | The engine fuel valve and the M101 is controlled simultaneously to drive the engine from low speed to high speed and to charge the battery simultaneously | OFF | *OFF **OFF ***ON | 0-MAX | *OFF | ON | *OFF **ON ***ON | *ON **ON ***OFF | GEN- | CHARGE | |
| F1-C | The engine is speed controlled or operated at a constant speed, wherein the battery charging current from the M101 is controlled to change the output power to the load; | OFF | OFF | *0-MAX OR CONSTANT SPEED **0-MAX | OFF | ON | *OFF **ON | ON | GEN- | DIS-CHARGE | *Drive the rear section load **Drive the front and rear section loads simultaneously |
| F1-D | The engine is speed controlled or operated at a constant speed, wherein the M101 generates short cut current to control the output shaft torque, thereby to change the engine speed | OFF | OFF | *0-MAX OR CONSTANT SPEED **0-MAX | OFF | ON | *OFF **ON | ON | GEN- | READY | *Drive the rear section load **Drive the front and rear section loads simultaneously |
| F2 | The M101 is powered by the battery to change the speed or the rotation direction of the rear section load | ON | OFF | STOP | OFF | OFF | OFF | ON | MOTOR | DIS-CHARGE | |
| F4-A | The engine is operated at a preset speed while the M101 is operated as a motor to provide added power output to drive the rear section load | OFF | OFF | 0-MAX OR CONSTANT SPEED | OFF | ON | OFF | ON | MOTOR | DIS-CHARGE | |
| F4-B | The engine is operated at a preset speed while the M101 is operated as a motor to provide added power output to drive the front and rear section loads | OFF | OFF | 0-MAX | OFF | ON | ON | ON | MOTOR | DIS-CHARGE | |
| F5 | The M101 is operated as a generator to charge the battery using the recovered rear section kinetic energy | *OFF **ON | OFF | *SLOW OR STOP **STOP-MAX | OFF | *ON **OFF | OFF | ON | GEN- | CHARGE | *The engine piston friction damping is activated simultaneously **Recovery of the kinetic energy |
| F7 | All the loads are braked by the engine friction damping | OFF | OFF | SLOW OR STOP | OFF | ON | ON | ON | READY | READY | |
| F8 | The system is self charged (It can be stopped at a preset time or controlled by the capacity) through that the M101 is driven by the engine to be operated as a generator to charge the battery | OFF | ON | 0-MAX OR CONSTANT SPEED | OFF | ON | OFF | OFF | GEN- | CHARGE | |

TABLE 2-continued

| FUNCTIONS | B101 | B102 | P101 | CL101 | CL102 | CL103 | CL104 | G/M (M101) | BT101 | REMARK |
|---|---|---|---|---|---|---|---|---|---|---|
| or to provide varied or constant frequency AC generation output | | | | | | | | | | |
| F9  The M101 is operated as a motor to start the engine | OFF | ON | STOP TO START | OFF | ON | OFF | OFF | MOTOR READY | DIS-CHARGE READY | |
| F10  Neutral Slide | OFF | OFF | STOP OT 0-MAX | OFF | OFF | OFF | OFF | READY | | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 3

| FUNCTIONS | B101 | P101 | CL101 | CL102 | CL103 | (M101) | BT101 | REMARK |
|---|---|---|---|---|---|---|---|---|
| F1-A | OFF | 0-MAX | *ON **ON ***OFF | ON | *OFF **ON ***ON | *READY **READY ***READY | *READY **READY ***READY | *Drive the rear section load **Drive the front and rear section loads simultaneously ***Drive the front section load |
| F1-B | OFF | 0-MAX | *OFF | ON | *OFF **ON ***ON | GEN- | CHARGE | |
| F1-C | OFF | *0-MAX OR CONSTANT SPEED **0-MAX | OFF | ON | *OFF **ON | GEN- | DIS-CHARGE | *Drive the rear section load **Drive the front and rear section loads simultaneously |
| F1-D | OFF | *0-MAX OR CONSTANT SPEED **0-MAX | OFF | ON | *OFF **ON | GEN- | READY | *Drive the rear section load **Drive the front and rear section loads simultaneously |
| F2 | ON | STOP | OFF | OFF | OFF | MOTOR | DIS-CHARGE | |
| F4-A | OFF | 0-MAX OR CONSTANT SPEED | OFF | ON | OFF | MOTOR | DIS-CHARGE | |
| F4-B | OFF | 0-MAX | OFF | ON | ON | MOTOR | DIS-CHARGE | |
| F5 | *OFF **ON | *SLOW OR STOP **STOP-MAX | OFF | *ON **OFF | OFF | GEN- | CHARGE | *The engine piston friction damping is activated simultaneously **Recovery of the kinetic energy |
| F7 | OFF | SLOW OR STOP | OFF | ON | ON | READY | READY | The operation is limited |
| F8 | OFF | 0-MAX OR CONSTANT SPEED | OFF | ON | OFF | GEN- | CHARGE when the engine is stopped | and the rear load brake |

FUNCTIONS:

F1-A: The engine fuel valve is controlled to drive the engine from low speed to high speed F1-B: The engine fuel vale and the M101 is controlled simultaneously to drive the engine from low speed to high speed and to charge the battery simultaneously F1-C: The engine is speed controlled or operated at a constant speed, wherein the battery charging current from the M101 is controlled to change the output power to the load;

F1-D: The engine is speed controlled or operated at a constant speed, wherein the M101 generates short cut current to control the output shaft torque, thereby to change the engine speed F2: The M101 is powered by the battery to change the speed or the rotation direction of the rear section load F4-A: The engine is operated at a preset speed while the M101 is operated as a motor to provide added power output to drive the rear section load F4-B: The engine is operated at a preset speed while the M101 is operated as a motor to provide added power oputput to drive the front and rear section loads F5: The M101 is operated as a generator to charge the battery using the recovered rear section kinetic energy F7: All the loads are braked by the engine friction damping F8: The system is self charged (It can be stopped at a preset time or controlled by the capacity) through that the M101 is drived by the engine to be operated as a generator to charge the battery is locked.

TABLE 3-continued

| FUNCTIONS | | COMPONENTS | | | | | | |
|---|---|---|---|---|---|---|---|---|
| | | B101 | P101 | CL101 | CL102 | CL103 | (M101) | BT101 | REMARK |
| F9 | or to provide varied or constant frequency AC generation output The M101 is operated as a motor to start the engine | OFF | STOP TO START | OFF | ON | OFF | MOTOR | DIS- | CHARGE |
| F10 | Neutral Slide | OFF | STOP TO 0-MAX | OFF | OFF | OFF | READY | READY | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 4

| FUNCTIONS | | B101 | P101 | CL101 | CL102 | CL103 | (M101) | BT101 | REMARK |
|---|---|---|---|---|---|---|---|---|---|
| F1-A | The engine fuel valve is controlled to drive the engine from low speed to high speed | OFF | 0-MAX | *ON **ON ***OFF | ON | *OFF **ON ***ON | *READY **READY ***READY | *READY **READY ***READY | *Drive the rear section load **Drive the front and rear section loads simultaneously ***Drive the front section load |
| F1-B | The engine fuel valve and the M101 is controlled simultaneously to drive the engine from low speed to high speed and to charge the battery simultaneously | OFF | 0-MAX | *OFF | ON | *OFF **ON ***ON | GEN- | CHARGE | |
| F1-C | The engine is speed controlled or operated at a constant speed, wherein the battery charging current from the M101 is controlled to change the output power to the load | OFF | *0-MAX OR CONSTANT SPEED **0-MAX | OFF | ON | *OFF **ON | GEN- | DIS-CHARGE | *Drive the rear section load **Drive the front and rear section loads simultaneously |
| F1-D | The engine is speed controlled or operated at a constant speed, wherein the M101 generates short cut current to control the output shaft torque, thereby to change the engine speed | OFF | *0-MAX OR CONSTANT SPEED **0-MAX | OFF | ON | *OFF **ON | GEN- | READY | *Drive the rear section load **Drive the front and rear section loads simultaneously |
| F2 | The M101 is powered by the battery to change the speed or the rotation direction of the rear section load | ON | STOP | OFF | OFF | OFF | MOTOR | DIS-CHARGE | |
| F4-A | The engine is operated at a preset speed while the M101 is operated as a motor to provide added power output to drive the rear section load | OFF | 0-MAX OR CONSTANT SPEED | OFF | ON | OFF | MOTOR | DIS-CHARGE | |
| F4-B | The engine is operated at a preset speed while the M101 is operated as a motor to provide added power opuput to drive the front and rear section loads | OFF | 0-MAX | OFF | ON | ON | MOTOR | DIS-CHARGE | |
| F5 | The M101 is operated as a generator to charge the battery using the recovered rear section kinetic energy | *OFF **ON | *SLOW OR STOP **STOP-MAX | OFF | *ON **OFF | OFF | GEN- | CHARGE | *The engine piston friction damping is activated simultaneously **Recovery of the kinetic energy |
| F6 | The M101 is operated as a generator to charge the battery using the recovered front section kinetic energy | OFF | *SLOW OR STOP **STOP-MAX | *ON **OFF | ON | GEN- | CHARGE | | *The engine piston friction damping is activated simultaneously **Recovery of the kinetic energy |
| F7 | All the loads are braked by | OFF | SLOW OR | OFF | ON | ON | READY | READY | |

TABLE 4-continued

| FUNCTIONS | | B101 | P101 | CL101 | CL102 | CL103 | (M101) | BT101 | REMARK |
|---|---|---|---|---|---|---|---|---|---|
| F8 | the engine friction damping. The system is self charged (It can be stopped at a preset time or controlled by the capacity) through that the M101 is drived by the engine to be operated as a generator to charge the battery or to provide varied or constant frequency AC generation output | OFF is locked. | STOP 0-MAX OR CONSTANT SPEED | OFF | ON | OFF | GEN- | CHARGE when the engine is stopped | The operation is limited and the rear load brake |
| F9 | The M101 is operated as a motor to start the engine | OFF | STOP TO START | OFF | ON | OFF | MOTOR | DIS- | CHARGE |
| F10 | Neutral Slide | OFF | STOP TO 0-MAX | OFF | OFF | OFF | READY | READY | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 5

| FUNCTIONS | B101 | B102 | P101 | CL101 | CL102 | CL103 | CL104 | G/M (M101) | BT101 | REMARK |
|---|---|---|---|---|---|---|---|---|---|---|
| F1-A | OFF | *OFF<br>OFF<br>*OFF | 0-MAX | *ON<br>ON<br>*OFF | ON | *OFF<br>ON<br>*ON | *ON<br>ON<br>*OFF | *READY<br>READY<br>*READY | *READY<br>READY<br>*READY | *Drive the rear section load<br>Drive the front and rear section loads simultaneously<br>*Drive the front section load |
| F1-B | OFF | *OFF<br>OFF<br>*ON | 0-MAX | *OFF | ON | *OFF<br>ON<br>*ON | *ON<br>ON<br>*OFF | *READY<br>READY<br>*GEN- | *READY<br>READY<br>*CHARGE | The engine fuel vale and the M101 is controlled simultaneously to drive the engine from low speed to high speed and to charge the battery simultaneously |
| F1-C | OFF | OFF | *0-MAX OR CONSTANT SPEED<br>**0-MAX | OFF | ON | *OFF<br>**ON | ON | GEN- | DIS-CHARGE | The engine is speed controlled or operated at a constant speed, wherein the battery charging current from the M101 is controlled to change the output power to the load. |
| F1-D | OFF | OFF | *0-MAX OR CONSTANT SPEED<br>**0-MAX | OFF | ON | *OFF<br>**ON | ON | GEN- | READY | The engine is speed controlled or operated at a constant speed, wherein the M101 generates short cut current to control the output shaft torque, thereby to change the engine speed |
| F2 | ON | OFF | STOP | OFF | OFF | OFF | ON | MOTOR | DIS-CHARGE | The M101 is powered by the battery to change the speed or the rotation direction of the rear section load |
| F3 | OFF | ON | STOP | OFF | OFF | ON | OFF | MOTOR | DIS-CHARGE | The M101 is powered by the battery to change the speed or the rotation direction of the front section load |
| F4-A | OFF | OFF | 0-MAX OR CONSTANT SPEED | OFF | ON | OFF | ON | MOTOR | DIS-CHARGE | The engine is operated at a preset speed while the M101 is operated as a motor to provide added power output to drive the rear section load |
| F4-B | OFF | OFF | 0-MAX | OFF | ON | ON | ON | MOTOR | DIS-CHARGE | The engine is operated at a preset speed while the M101 is operated as a motor to provide added power oputput to drive the front and rear section loads |
| F5 | *OFF<br>**ON | OFF | *SLOW OR STOP<br>**STOP-MAX | OFF | *ON<br>**OFF | OFF | ON | GEN- | CHARGE | *The engine piston friction damping is activated simultaneously<br>**Recovery of the kinetic energy |
| F6 | OFF | ON | *SLOW OR STOP<br>**STOP-MAX | OFF | *ON<br>**OFF | ON | OFF | GEN- | CHARGE | *The engine piston friction damping is activated simultaneously<br>**Recovery of the kinetic energy |

TABLE 5-continued

| | | | | | | COMPONENTS | | | | |
|---|---|---|---|---|---|---|---|---|---|---|
| FUNCTIONS | | B101 | B102 | P101 | CL101 | CL102 | CL103 | CL104 | G/M (M101) | BT101 | REMARK |
| F7 | All the loads are braked by the engine friction damping | OFF | OFF STOP | SLOW OR | OFF | ON | ON | ON | READY | READY | |
| F8 | The system is self charged (It can be stopped at a preset time or controlled by the capacity) through that the M101 is drived by the engine to be operated as a generator to charge the battery or to provide varied or constant frequency AC generation output | OFF | ON | 0-MAX OR CONSTANT SPEED | OFF | ON | OFF | OFF | GEN- | CHARGE | The operation is limited to when the engine is stopped |
| F9 | The M101 is operated as a motor to start the engine | OFF | ON | STOP TO START | OFF | ON | OFF | OFF | MOTOR | DIS-CHARGE | |
| F10 | Neutral Slide | OFF | OFF | STOP OT 0-MAX | OFF | OFF | OFF | OFF | READY | READY | |
| F11 | The engine is used to drive the front section load, and the M101 is used to drive the rear section load, and both are independently operated | ON | OFF | 0-MAX | OFF | ON | ON | ON | OFF | MOTOR | DIS-CHARGE |
| F12 | The engine is used to drive the front section load and the M101 is pulled to be operated as a generator to charge the battery | ON | OFF | 0-MAX | OFF | ON | ON | OFF | GEN- | CHARGE | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 6

| FUNCTIONS | | B101 | B102 | P101 | CL101 | CL102 | CL103 | CL104 | G/M (M101) | BT101 | REMARK |
|---|---|---|---|---|---|---|---|---|---|---|---|
| F1-A | The engine fuel valve is controlled to drive the engine from low speed to high speed | OFF | *OFF **OFF ***OFF | 0-MAX | *ON **ON ***OFF | ON | *OFF **ON ***ON | *ON **ON ***OFF | *READY **READY ***READY | *READY **READY ***READY | *Drive the rear section load **Drive the front and rear section loads simultaneously ***Drive the front section load |
| F1-B | The engine fuel vale and the M101 is controlled simultaneously to drive the engine from low speed to high speed and to charge the battery simultaneously | OFF | *OFF **OFF ***ON | 0-MAX | *OFF | ON | *OFF **ON ***ON | *ON **ON ***OFF | GEN- | DIS-CHARGE | |
| F1-C | The engine is speed controlled or operated at a constant speed, wherein the battery charging current from the M101 is controlled to change the output power to the load; | OFF | OFF | *0-MAX OR CONSTANT SPEED **0-MAX | OFF | ON | *OFF **ON | ON | GEN- | DIS-CHARGE | *Drive the rear section load **Drive the front and rear section loads simultaneously |
| F1-D | The engine is speed controlled or operated at a constant speed, wherein the M101 generates short cut current to control the output shaft torque, thereby to change the engine speed | OFF | OFF | *0-MAX OR CONSTANT SPEED **0-MAX | OFF | ON | *OFF **ON | ON | GEN- | READY | *Drive the rear section load **Drive the front and rear section loads simultaneously |
| F2 | The M101 is powered by the battery to change the speed or the rotation direction of the rear section load | ON | OFF | STOP | OFF | OFF | OFF | ON | MOTOR | DIS-CHARGE | |
| F4-A | The engine is operated at a preset speed while the M101 is operated as a motor to provide added power output to drive the rear section load | OFF | OFF | 0-MAX OR CONSTANT SPEED | OFF | ON | OFF | ON | MOTOR | DIS-CHARGE | |
| F4-B | The engine is operated at a preset speed while the M101 is operated as a motor to provide added power oputput to drive the front and rear section loads | OFF | OFF | 0-MAX | OFF | ON | ON | ON | MOTOR | DIS-CHARGE | |
| F5 | The M101 is operated as a generator to charge the battery using the recovered rear section kinetic energy | *OFF **ON | OFF | *SLOW OR STOP **STOP-MAX | OFF | *ON **OFF | OFF | ON | GEN- | CHARGE | *The engine piston friction damping is activated simultaneously **Recovery of the kinetic energy |
| F7 | All the loads are braked by the engine friction damping | OFF | OFF STOP | SLOW OR | OFF | ON | ON | ON | READY | READY | The operation is limited to when the engine is stopped |
| F8 | The system is self charged (It can be stopped at a preset time or controlled by the capacity) through that the M101 is drived by the engine to be operated as a generator to charge the battery | OFF | ON | 0-MAX OR CONSTANT SPEED | OFF | ON | OFF | OFF | GEN- | CHARGE | |

TABLE 6-continued

| FUNCTIONS | | B101 | B102 | P101 | CL101 | CL102 | CL103 | CL104 | G/M (M101) | BT101 | REMARK |
|---|---|---|---|---|---|---|---|---|---|---|---|
| | or to provide varied or constant frequency AC generation output | | | | | | | | | | |
| F9 | The M101 is operated as a motor to start the engine | OFF | ON | STOP TO START | OFF | ON | OFF | OFF | MOTOR | DIS-CHARGE | |
| F10 | Neutral Slide | OFF | OFF | STOP OT 0-MAX | OFF | OFF | OFF | OFF | READY | READY | |
| F11 | The engine is used to drive the front section load, and the M101 is used to drive the rear section load, and both are independently operated | ON | OFF | 0-MAX | OFF | ON | ON | ON | OFF | MOTOR | DIS-CHARGE |
| F12 | The engine is used to drive the front section load and the M101 is pulled to be operated as a generator to charge the battery | ON | OFF | 0-MAX | OFF | ON | ON | OFF | GEN- | CHARGE | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 7

| FUNCTIONS | B101 | P101 | CL101 | CL102 | CL103 | CL105 | G/M (M101) | BT101 | REMARK |
|---|---|---|---|---|---|---|---|---|---|
| F1-A | OFF | 0-MAX | *ON **ON ***OFF | ON | *OFF **ON ***ON | *ON **ON ***OFF | *READY **READY ***READY | *READY **READY ***CHARGE | *Drive the rear section load **Drive the front and rear section loads simultaneously ***Drive the front section load |
| F1-B | OFF | 0-MAX | *OFF | ON | *OFF **ON ***ON | *ON **ON ***OFF | GEN- | CHARGE | |
| F1-C | OFF | *0-MAX OR CONSTANT SPEED | **0-MAX | ON | *OFF **ON | ON | GEN- | DIS-CHARGE | *Drive the rear section load **Drive the front and rear section loads simultaneously |
| F1-D | OFF | *0-MAX OR CONSTANT SPEED **0-MAX | OFF | ON | *OFF **ON | ON | GEN- | READY | *Drive the rear section load **Drive the front and rear section loads simultaneously |
| F2 | ON | STOP | OFF | OFF | OFF | ON | MOTOR | DIS-CHARGE | |
| F4-A | OFF | 0-MAX OR CONSTANT SPEED | OFF | ON | OFF | ON | MOTOR | DIS-CHARGE | |
| F4-B | OFF | 0-MAX | OFF | ON | ON | ON | MOTOR | DIS-CHARGE | |
| F5 | *OFF **ON | *SLOW OR STOP ***STOP-MAX | OFF | *ON **OFF | OFF | ON | GEN- | CHARGE | *The engine piston friction damping is activated simultaneously **Recovery of the kinetic energy |
| F7 | OFF | SLOW OR STOP | OFF | ON | ON | ON | READY | READY | All the loads are braked by the engine friction damping |
| F8 | OFF | 0-MAX OR CONSTANT SPEED | OFF | ON | OFF | OFF | GEN- | CHARGE | The operation is limited to when the engine is stopped and the rear load brake is locked |

Functions descriptions (FUNCTIONS column continued):

- F1-A: The engine fuel valve is controlled to drive the engine from low speed to high speed
- F1-B: The engine fuel vale and the M101 is controlled simultaneously to drive the engine from low speed to high speed and to charge the battery simultaneously
- F1-C: The engine is speed controlled or operated at a constant speed, wherein the battery charging current from the M101 is controlled to change the output power to the load;
- F1-D: The engine is speed controlled or operated at a constant speed, wherein the M101 generates short cut current to control the output shaft torque, thereby to change the engine speed
- F2: The M101 is powered by the battery to change the speed or the rotation direction of the rear section load
- F4-A: The engine is operated at a preset speed while the M101 is operated as a motor to provide added power output to drive the rear section load
- F4-B: The engine is operated at a preset speed while the M101 is operated as a motor to provide added power output to drive the front and rear section loads
- F5: The M101 is operated as a generator to charge the battery using the recovered rear section kinetic energy
- F7: All the loads are braked by the engine friction damping
- F8: The system is self charged (It can be stopped at a preset time or controlled by the capacity) through that the M101 is drived by the engine to be operated as a generator to charge the battery TABLE 7-continued

| | | COMPONENTS | | | | | | | |
|---|---|---|---|---|---|---|---|---|---|
| FUNCTIONS | | B101 | P101 | CL101 | CL102 | CL103 | CL105 | G/M (M101) | BT101 | REMARK |
| F9 | or to provide varied or constant frequency AC generation output | | | | | | | | |
| | The M101 is operated as a motor to start the engine | OFF | STOP TO START | OFF | ON | OFF | OFF | MOTOR | DIS-CHARGE |
| F10 | Neutral Slide | OFF | STOP OT 0-MAX | OFF | OFF | OFF | OFF | READY | READY |
| F11 | The engine is used to drive the front section load, and the M101 is used to drive the rear section load, and both are independently operated | ON | 0-MAX | OFF | ON | ON | ON | OFF | MOTOR | DIS-CHARGE |
| F12 | The engine is used to drive the front section load and the M101 is pulled to be operated as a generator to charge the battery | ON | 0-MAX | OFF | ON | ON | OFF | GEN- | CHARGE |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

TABLE 8

| FUNCTIONS | | COMPONENTS | | | | | | | REMARK |
|---|---|---|---|---|---|---|---|---|---|
| | | B101 | P101 | CL102 | CL103 | CL105 | G/M (M101) | BT101 | |
| F1-A | The engine fuel valve is controlled to drive the engine from low speed to high speed | OFF | 0-MAX | ON | *OFF **ON ***ON | *ON **ON ***OFF | READY **READY ***READY | *READY **READY ***READY | *Drive the rear section load **Drive the front and rear section loads simultaneously ***Drive the front section load |
| F1-B | The engine fuel valve and the M101 is controlled simultaneously to drive the engine from low speed to high speed and to charge the battery simultaneously | OFF | 0-MAX | ON | *OFF **ON ***ON | *ON **ON ***OFF | GEN- | DIS-CHARGE | |
| F1-C | The engine is speed controlled or operated at a constant speed, wherein the battery charging current from the M101 is controlled to change the output power to the load; | OFF **0-MAX | *0-MAX OR CONSTANT SPEED | ON | *OFF **ON | ON | GEN- | DIS-CHARGE | *Drive the rear section load **Drive the front and rear section loads simultaneously |
| F1-D | The engine is speed controlled or operated at a constant speed, wherein the M101 generates short cut current to control the output shaft torque, thereby to change the engine speed | OFF | *0-MAX OR CONSTANT SPEED **0-MAX | ON | *OFF **ON | ON | GEN- | READY | *Drive the rear section load **Drive the front and rear section loads simultaneously |
| F2 | The M101 is powered by the battery to change the speed or the rotation direction of the rear section load | ON | STOP | OFF | OFF | OFF | MOTOR | DIS-CHARGE | |
| F4-A | The engine is operated at a preset speed while the M101 is operated as a motor to provide added power output to drive the rear section load | OFF | 0-MAX OR CONSTANT SPEED | ON | OFF | ON | MOTOR | DIS-CHARGE | |
| F4-B | The engine is operated at a preset speed while the M101 is operated as a motor to provide added power output to drive the front and rear section loads | OFF | 0-MAX | ON | ON | ON | MOTOR CHARGE | DIS- | |
| F5 | The M101 is operated as a generator to charge the battery using the recovered rear section kinetic energy | *OFF **ON | *SLOW OR STOP **STOP-MAX | *ON **OFF | OFF | ON | GEN- | CHARGE | *The engine piston friction damping is activated simultaneously **Recovery of the kinetic energy |
| F7 | All the loads are braked by the engine friction damping | OFF | SLOW OR STOP | ON | ON | ON | READY | READY | |
| F8 | The system is self charged (It can be stopped at a preset time or controlled by the capacity) through that the M101 is drived by the engine to be operated as a generator to charge the battery | OFF | 0-MAX OR CONSTANT SPEED | ON | OFF | OFF | GEN- | CHARGE | The operation is limited to when the engine is stopped and the rear load brake is locked |

TABLE 8-continued

| FUNCTIONS | | COMPONENTS | | | | | | |
|---|---|---|---|---|---|---|---|---|
| | | B101 | P101 | CL102 | CL103 | CL105 | G/M (M101) | BT101 | REMARK |
| | or to provide varied or constant frequency AC generation output | | | | | | | | |
| F9 | The M101 is operated as a motor to start the engine | OFF | STOP TO START | ON | OFF | ON | MOTOR | DIS-CHARGE | |
| F10 | Neutral Slide | OFF | STOP TO 0-MAX | OFF | OFF | OFF | READY | READY | |
| F11 | The engine is used to drive the front section load, and the M101 is used to drive the rear section load, and both are independently operated | ON | 0-MAX | ON | ON | ON | OFF | MOTOR | DIS-CHARGE |
| F12 | The engine is used to drive the front section load and the M101 is pulled to be operated as a generator to charge the battery | ON | 0-MAX | ON | ON | OFF | GEN- | CHARGE | |

Notes:
1) CHARGE current of F1-B is load following distributed
2) The M101 is an electromagnetic coupling device
3) BT101 is the battery
4) GEN- is a generator
5) For the case of engine, the P101 is the drive side rotational power source which is employed to drive the front section load and is series combined with the M101 to drive the rear section load
6) For the case of AC power output function in F8, the said M101 is selected to employee the electrical machine with AC power generating functions comprised of a permanent magnet or winding excited, varied frequency driven field type electrical device, or a brushed alternator type electrical device, wherein its armature winding is commonly installed the conducting rings for AC output and the communicators for DC input/output.

I claim:

1. A differential combined power distribution system for use in rotational driving applications, comprising:

a rotational power source which includes a rotational output shaft coupled to drive a front section load, and also coupled with the input shaft of an electromagnetic coupling device to drive a rear section load, wherein the electromagnetic coupling device includes means for generating a rotating electromagnetic field, and a rotor arranged to electromagnetically couple with said field; and an operating device which includes means for controlling the electromagnetic coupling device to generate motor driving functions when an input current is applied and to generate variable speed coupling functions through an output current when the electromagnetic coupling device is employed as a generator, the operating device also including means for controlling the electromagnetic coupling device to start the engine and to serve as a power regeneration brake when the engine is the main power source for the front and rear section loads, means for causing the electromagnetic coupling device to charge a battery through a difference between a rotational speed of the rotational field and a rotational speed of the rotor, and means for adjusting the speed difference by controlling a battery charging current, wherein the operating device thereby allows the rotational power source to be driven at a constant speed and at a partially adjustable speed to improve operating efficiency and decrease pollution, with one part of the differential speed output power generated through the electromagnetic coupling device being used for driving one of the loads independently or together with the rotational power source while the remainder of the output power is converted through the generator function of the electromagnetic coupling device to charge the battery.

2. A differential mixing combined power distribution system, comprising:

a drive side rotational power source (P101) having an output which is first supplied to a front section load and is then transmitted to an input end of a electromagnetic coupling device (M101) to drive a rear section load;

the drive side rotational power source (P101) including a rotational output shaft (S102) coupled to a middle transmission device and a control interface (M102) through a clutch (CL102), the rotational power source further including a speed sensor (SD101) to transmit the engine rotation signal to a central controller (CCU101) and a controllable fuel valve (CGIOI) controlled by the central controller (CCU101) to carry out the functions of changing the engine speed and keeping the engine maintained at a constant speed;

the middle transmission device and control interface (M102) including a speed change control system for driving the front section load only and also for driving both loads;

a middle input shaft (S101) coupled at the output end of the clutch (CL102);

the electromagnetic coupling device (M101) being coupled with the transmission middle shaft (S101) to drive the rear side drive unit;

a drive circuit device (D101) installed between the electromagnetic coupling device (M101) and the battery (BT101) and arranged to receive operating commands from a central controller (CCU101) to control the electromagnetic coupling device to function as a generator to charge the battery, supply power to any other loads connected thereto, and to provide a current controllable generator output to change the rotation speed in response to load conditions.

3. A system as claimed in claim 2, further comprising a brake (B102) located between differentially acting output shafts of the electromagnetic coupling device (M101) and a coupled rear differential gear box through which the rear section load is driven.

4. A system as claimed in claim 3, further comprising a clutch (CL104) positioned between the brake (B102) and the rear section load.

5. A system as claimed in claim 2, further comprising a clutch (CL103) installed between the middle input shaft (S101) and the front section load to provide a transmission coupling between the middle transmission device and the front section load.

6. A system as claimed in claim 5, further comprising a brake (B102) located between differentially acting output shafts of the electromagnetic coupling device (M101) and a coupled rear differential gear box through which the rear section load is driven.

7. A system as claimed in claim 6, further comprising a clutch (CL104) positioned between the brake (B102) and the rear section load.

8. A system as claimed in claim 7, wherein the central controller includes means for causing the system to carry out the following functions:

controlling the engine fuel valve to drive the engine from low speed to high speed;

controlling the engine fuel valve and the electromagnetic coupling device simultaneously to drive the engine from low speed to high speed and to charge the battery simultaneously;

changing a speed of the engine by causing the electromagnetic coupling device to generate a current for controlling an output shaft torque;

causing the electromagnetic coupling device to be powered by the battery to change a rotation direction of the rear section load;

powering the electromagnetic coupling device by the battery to change a speed or direction of the front section load;

operating the engine at a preset speed while the electromagnetic coupling device is operated as a motor to provide additional power for driving the rear section load;

operating the engine at a preset speed while the electromagnetic coupling device is operated as a motor to provide added power output to drive the front and rear section loads;

operating the engine as a generator to charge the battery using kinetic energy recovered from the rear section load;

operating the electromagnetic coupling device as a generator to charge the battery using kinetic energy recovered from the front section load;

causing all loads to be braked by engine friction damping;

causing the electromagnetic coupling device to be driven by the engine to function as generator to charge the battery or provide varied or constant frequency alternating current output for different situations; and operation the electromagnetic coupling device as a motor to start the engine.

9. A system as claimed in claim 6, wherein the central controller includes means for causing the system to carry out the following functions:
- controlling the engine fuel valve to drive the engine from low speed to high speed;
- controlling the engine fuel valve and the electromagnetic coupling device simultaneously to drive the engine from low speed to high speed and to charge the battery simultaneously;
- changing a speed of the engine by causing the electromagnetic coupling device to generate a current for controlling an output shaft torque;
- causing the electromagnetic coupling device to be powered by the battery to change a rotation direction of the rear section load;
- operating the engine at a preset speed while the electromagnetic coupling device is operated as a motor to provide additional power for driving the rear section load;
- operating the engine as a generator to charge the battery using kinetic energy recovered from the rear section load;
- causing all loads to be braked by engine friction damping; and
- causing the electromagnetic coupling device to be driven by the engine to function as generator for charging the battery and to provide an electromagnetic coupling output to any additional loads connected thereto.

10. The system as in claim 5, wherein the central controller includes means for causing the system to carry out the following functions:
- controlling the engine fuel valve to drive the engine from low speed to high speed;
- controlling the engine fuel valve and the electromagnetic coupling device simultaneously to drive the engine from low speed to high speed and to charge the battery simultaneously;
- changing a speed of the engine by causing the electromagnetic coupling device to generate a current for controlling an output shaft torque;
- causing the electromagnetic coupling device to be powered by the battery to change a rotation direction of the rear section load;
- operating the engine at a present speed while the electromagnetic coupling device is operated as a motor to provide additional power for driving the rear section load;
- operating the engine as a generator to charge the battery using kinetic energy recovered from the rear section load;
- causing all loads to be braked by engine friction damping; and
- causing the electromagnetic coupling device to be driven by the engine to function as generator for charging the battery and to provide an electromagnetic coupling output to any additional loads connected thereto.

11. A system as claimed in claim 4, wherein the central controller includes means for causing the system to carry out the following functions:
- controlling the engine fuel valve to drive the engine from low speed to high speed;
- controlling the engine fuel valve and the electromagnetic coupling device simultaneously to drive the engine from low speed to high speed and to charge the battery simultaneously;
- changing a speed of the engine by causing the electromagnetic coupling device to generate a current for controlling an output shaft torque;
- causing the electromagnetic coupling device to be powered by the battery to change a rotation direction of the rear section load;
- operating the engine at a preset speed while the electromagnetic coupling device is operated as a motor to provide additional power for driving the rear section load;
- operating the engine as a generator to charge the battery using kinetic energy recovered from the rear section load;
- operating the engine as a generator to charge the battery using kinetic energy recovered from the front section load;
- causing all loads to be braked by engine friction damping; and
- causing the electromagnetic coupling device to be driven by the engine to function as generator for charging the battery and to provide an electromagnetic coupling output to any additional loads connected thereto.

12. A system as claimed in claim 4, further including a clutch (CL105) between the rear section output middle shaft and the middle transmission device, wherein the central controller includes means for causing the system to carry out the following functions:
- controlling the engine fuel valve to drive the engine from low speed to high speed;
- controlling the engine fuel valve and the electromagnetic coupling device simultaneously to drive the engine from low speed to high speed and to charge the battery simultaneously;
- changing a speed of the engine by causing the electromagnetic coupling device to generate a current for controlling an output shaft torque;
- causing the electromagnetic coupling device to be powered by the battery to change a rotation direction of the rear section load;
- causing the electromagnetic coupling device to be powered by the battery to change a rotation or speed of the front section load;
- operating the engine at a preset speed while the electromagnetic coupling device is operated as a motor to provide additional power for driving the rear section load;
- operating the engine as a generator to charge the battery using kinetic energy recovered from the rear section load;
- operating the engine as a generator to charge the battery using kinetic energy recovered from the front section load;
- causing all loads to be braked by engine friction damping;
- causing the electromagnetic coupling device to be driven by the engine to function as generator for charging the battery and to provide an electromagnetic coupling output to any additional loads connected thereto;
- operating the engine to drive the front section load and independently operating the electromagnetic coupling device to drive the rear section load; and
- operating the engine to drive the front section load and causing the engine to also drive the electromagnetic coupling device to charge the battery.

13. A system as claimed in claim 3, further comprising clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electromagnetic coupling device simultaneously to drive the engine from low speed to high speed and to charge the battery simultaneously;

changing a speed of the engine by causing the electromagnetic coupling device to generate a current for controlling an output shaft torque;

causing the electromagnetic coupling device to be powered by the battery to change a rotation direction of the rear section load;

causing the electromagnetic coupling device to be powered by the battery to change a rotation or speed of the front section load;

operating the engine at a preset speed while the electromagnetic coupling device is operated as a motor to provide additional power for driving the rear section load;

operating the engine as a generator to charge the battery using kinetic energy recovered from the rear section load;

causing all loads to be braked by engine friction damping;

causing the electromagnetic coupling device to be driven by the engine to function as generator for charging the battery and to provide an electromagnetic coupling output to any additional loads connected thereto;

operating the engine to drive the front section load and independently operating the electromagnetic coupling device to drive the rear section load; and operating the engine to drive the front section load and causing the engine to also drive the electromagnetic coupling device to charge the battery.

14. A system as claimed in claim 5, further comprising a clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electromagnetic coupling device simultaneously to drive the engine from low speed to high speed and to charge the battery simultaneously;

changing a speed of the engine by causing the electromagnetic coupling device to generate a current for controlling an output shaft torque;

causing the electromagnetic coupling device to be powered by the battery to change a rotation direction of the rear section load;

causing the electromagnetic coupling device to be powered by the battery to change a rotation or speed of the front section load;

operating the engine at a preset speed while the electromagnetic coupling device is operated as a motor to provide additional power for driving the rear section load;

operating the engine as a generator to charge the battery using kinetic energy recovered from the rear section load;

causing all loads to be braked by engine friction damping;

causing the electromagnetic coupling device to be driven by the engine to function as generator for charging the battery and to provide an electromagnetic coupling output to any additional loads connected thereto;

operating the engine to drive the front section load and independently operating the electromagnetic coupling device to drive the rear section load; and operating the engine to drive the front section load and causing the engine to also drive the electromagnetic coupling device to charge the battery.

15. A system as claimed in claim 2, further comprising a clutch (CL103) installed between the middle input shaft (S101) and the front section load to provide a transmission coupling between the middle transmission device and the front section load, and a clutch (CL105) between the rear section output middle shaft and the middle transmission device, wherein the central controller includes means for causing the system to carry out the following functions:

controlling the engine fuel valve to drive the engine from low speed to high speed;

controlling the engine fuel valve and the electromagnetic coupling device simultaneously to drive the engine from low speed to high speed and to charge the battery simultaneously;

changing a speed of the engine by causing the electromagnetic coupling device to generate a current for controlling an output shaft torque;

causing the electromagnetic coupling device to be powered by the battery to change a rotation direction of the rear section load;

causing the electromagnetic coupling device to be powered by the battery to change a rotation or speed of the front section load;

operating the engine at a preset speed while the electromagnetic coupling device is operated as a motor to provide additional power for driving the rear section load;

operating the engine as a generator to charge the battery using kinetic energy recovered from the rear section load;

causing all loads to be braked by engine friction damping;

causing the electromagnetic coupling device to be driven by the engine to function as generator for charging the battery and to provide an electromagnetic coupling output to any additional loads connected thereto;

operating the engine to drive the front section load and independently operating the electromagnetic coupling device to drive the rear section load; and operating the engine to drive the front section load and causing the engine to also drive the electromagnetic coupling device to charge the battery.

16. A system as claimed in claim 2, wherein the front and rear section loads are wheels and relationships between the front and rear section loads is set not to operate according to the wheel system ratio relationship, but to operate through a differentially acting adjustment by the electromagnetic coupling device (U101).

17. A system as claimed in claim 16, wherein the differentially acting adjustment of the electromagnetic coupling device (U101) includes an active adjustment of the input power when the electromagnetic coupling device functions as a motor and a passive adjustment of the output power when the electromagnetic coupling device functions as a generator.

18. A system as claimed in claim 2, wherein the front section load is one of front and rear sets of wheels of a vehicle, and the rear section load is the other of the front and rear sets of wheels.

* * * * *